Patented Nov. 28, 1939

2,181,372

UNITED STATES PATENT OFFICE 2,181,372

PROCESS OF PUFFING CEREALS

John L. Kellogg, Chicago, Ill., assignor to New Foods, Inc., Chicago, Ill., a corporation of Delaware No Drawing. Application December 17, 1936, Serial No. 116,351

5 Claims. (Cl. 99—82)

This invention relates to the production of puffed or exploded cereals such as puffed wheat, rice and the like; and one of the objects of the invention is to provide a new and more palatable and digestible cooked, and subsequently puffed, cereal and process of producing same than any now on the market.

Another object is to provide a flavored, puffed cereal in which the flavoring substance permeates the puffed particles.

Other incidental objects will appear from the following description of certain preferred embodiments of the invention.

According to this invention the hulls of the grain in case whole grains such as wheat, rye, corn or other cereals are to be treated, are removed wholly or partially. This may be done by treating the grain with a caustic alkali solution, hot or cold, and then drawing off the solution and washing the material. Or the cereal after being soaked or boiled in the caustic alkali solution may be put through rough or rubbing rollers to remove the hulls. Or the grain may without the caustic alkali treatment, either in a dry or in moist state, be put through scarifying machines.

The material is then steeped at a relatively low temperature, referred to as a sub-cooking temperature, for the purpose of softening the grains, causing them to swell and bringing about a gelatinization or partial gelatinization of the starch. The word "steep" is used herein to indicate, as it usually does, "to soak in a liquid with heat below the boiling point". The temperature is preferably not in excess of 170° F. so that the operation can not be considered as a cooking operation. After this, the cereal may be dried, say to 12% to 15% moisture for the purpose of giving the grains a hard or horny exterior surface. The material is then puffed or exploded in a gun exteriorly heated to create relatively high internal steam pressure, which pressure, being suddenly released, brings about the puffing of the grains. If desired, steam may be introduced into the gun during the heating operation in which case the puffed material is given a light drying operation to evaporate any condensate which may be left on the grains.

Preferably a flavoring substance is introduced into the grain before or during the steeping operation so that this substance will be taken up by and will uniformly permeate the grain. It is possible to flavor the product in this way with salt, sugar or malt syrup, or other flavoring substance or substances. Malt wort may be added which will bring about the conversion of the starch into maltose or other sugars and thus give flavor to the product.

Preferably, also, the grain after being steeped and flavored is given a short cooking treatment, in a rotary cooker, for example, under steam pressure. This cooking step is much shorter than the cooking step ordinarily used for making cooked cereals. The long period of cooking tends to so obliterate or weaken the kernel structure that puffing to produce separate puffed particles is impractical or very inefficiently done. By first giving the cereal a steeping treatment at sub-cooking temperatures, followed by a short cooking treatment, the grains remain separate entities, instead of being cooked into a mushy mass, and their tendency to adhere to each other is so reduced as to make the puffing operation practical, while at the same time the material is effectively cooked, besides being given, if desired, a flavor which is not merely superficial but permeates the puffed particles.

The following are typical examples of processes embodying the invention. These examples are to be considered as informative and illustrative merely. The intention is to cover all equivalents of the described processes and all modifications thereof within the scope of the appended claims.

The examples deal with wheat, but the process is applicable to other grains or grits.

Example I (1) 3125 parts of wheat are boiled in 4000 parts of water containing 64 parts of caustic soda for 10 to 20 minutes. And the grain then separated from the solution and washed.

(2) The grains from which the hulls have been thus largely removed are mixed with 1500 parts of water containing 253 parts of cane sugar and the material steeped at 170° F. for three hours.

(3) The material is then cooked in a rotary cooker for 30 minutes under 15 pounds steam pressure.

(4) The material is then dried to 12% to 15% moisture.

(5) The material is thereupon put into a puffing gun, preferably of the rotary type which has been previously heated to about 610° F., and steam is introduced to bring the pressure up to 350 pounds per square inch. After about 30 seconds the pressure is relieved and the material discharged in exploded or puffed condition.

(6) The puffed material is passed through a drier to evaporate surface moisture due to condensation of steam.

The puffing may be accomplished without injections of steam into the gun. In such case the gun may be heated to temperatures between 570° and 750° F. and the material treated at this temperature for 7 minutes. The steam pressure is developed from the moisture in the grain.

Instead of boiling the wheat in a caustic alkali solution, it may be soaked in a cold solution for a longer period of time. The alkali treated grain after washing may be put through rough or differential rollers for the purpose of removing the hulls. Or without caustic alkali treatment the grain may be scarified.

Example II (1) The hull is removed as in Example I.

(2) 1348 parts water mixed with 252 parts of malt syrup, of the usual concentration, are added to 3125 parts of the grain (measured before removal of hulls) and the mixture kept at 148° F. for about one hour. Then the temperature is raised to 170° F. where it is maintained for about 2 hours or until the malt syrup solution is fully absorbed in the cereal substance.

(3) The grain is cooked for 30 minutes at 15 pounds steam pressure.

(4) The material is dried to 12% to 15% moisture.

(5) The material is puffed in either of the ways described in Example I.

Example III

The procedure is the same as in Example I except that instead of flavoring with malt syrup the grain may be subjected to a malting operation by addition thereto at stage (2) of 1500 parts of 4° Baumé malt wort.

Salt may be introduced at stage (2) in any of the above procedures. Sugar may be used also in Formulas II and III.

If it is desired to produce a flavored but uncooked product, the cooking step (3) in any of the above formulas may be omitted.

If desired, the puffing may be done in an oven or by any other suitable method.

I claim:

1. Process of puffing a hulled cereal which comprises: steeping the cereal at a sub-cooking temperature to bring about gelatinization of the starch and the swelling and softening of the grains; drying the material; and heating it, in the form of separate non-adherent grains under pressure and suddenly releasing the pressure to bring about an explosive puffing.

2. The process of puffing a hulled cereal which comprises: steeping the cereal at a sub-cooking temperature to bring about gelatinization of the starch and swelling and softening of the grains; giving the material a relatively short cooking treatment; drying the cooked material; and thereafter heating it in the form of separate non-adherent grains under pressure and suddenly releasing the pressure to bring about an explosive puffing.

3. The process of puffing a hulled cereal which comprises: steeping the cereal with a flavoring substance at a sub-cooking temperature to bring about gelatinization of the starch and swelling and softening of the grains, and to cause the flavoring substance to permeate the material; drying the material; and heating it in the form of separate non-adherent grains under pressure and suddenly releasing the pressure to bring about an explosive puffing.

4. The process of puffing a hulled cereal which comprises: steeping the cereal with a flavoring substance at a sub-cooking temperature to bring about gelatinization of the starch and swelling and softening of the grains and to cause the flavoring substance to permeate the material; giving the material a relatively short cooking treatment; drying the material; and heating it in the form of separate non-adherent grains under pressure and suddenly releasing the pressure to bring about an explosive puffing.

5. The process of puffing a hulled cereal which comprises: steeping the cereal with a flavoring substance and water at a temperature not substantially in excess of 170° F. for about three hours, cooking the material for about thirty minutes under about fifteen pounds steam pressure, drying the material to from about twelve to fifteen per cent moisture and heating the material in the form of non-adherent grain under pressure and suddenly releasing the pressure to bring about an explosive puffing.

JOHN L. KELLOGG.